United States Patent Office 2,888,439
Patented May 26, 1959

2,888,439

POLYURETHANE DIAMINES

Donald M. Simons, Wilmington, Del., assignor to E. I. du Pont de Nemours and Company, Wilmington, Del., a corporation of Delaware No Drawing. Application August 16, 1957
Serial No. 678,528

6 Claims. (Cl. 260—77.5)

This invention relates to novel polyurethane polymers, and more particularly to polyurethane diamines of controlled molecular weight.

One of the methods which has been used for the preparation of polyurethane polymers has been an interphase polymerization of a bischloroformate with an organic diamine. This method has not been entirely satisfactory since it has not been possible to prepare a polyurethane having a controlled molecular weight. It would be highly desirable, therefore, to be able to prepare polyurethane polymers, more particularly polyurethane diamines of controlled molecular weight which would be useful as elastomer intermediates and as hardening agents for epoxy resins.

It is an object of the present invention to provide novel polyurethane diamines. A further object is to provide novel polyurethane diamines which are highly useful as elastomer intermediates. A still further object is to provide a process for the preparation of these polyurethane diamines. Other objects will appear hereinafter.

These and other objects of the present invention are accomplished by providing polyurethane diamines of the formula

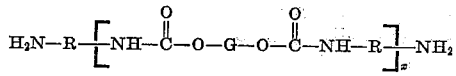

wherein O—G—O is a bivalent radical obtained by removing the terminal hydrogen atoms from a polymeric diol having a molecular weight of from about 720 to 5730 and being selected from the group consisting of polyalkyleneether glycols, polyalkylene-aryleneether glycols, and hydroxyl-terminated aliphatic hydrocarbon polymers; R is a bivalent arylene radical which is inert to isocyanate groups; and x is an integer so that the diamines have a molecular weight of from about 990 to 6000. These polyurethane diamines may be prepared by an acid hydrolysis of an isocyanate-terminated polyurethane, by a reduction of a nitro-terminated polyurethane, or by a reaction involving a bischloroformate of a polymeric diol and a diprimary diamine. These methods of preparation will be more particularly described hereinafter.

In preparing the novel polyurethane diamines of the present invention by means of an acid hydrolysis of an isocyanate-terminated polyurethane, a polymeric diol such as a polyalkyleneether glycol is first reacted with a molar excess of an arylene diisocyanate. This reaction may be carried out in one or more steps. Thus the diol may be reacted with the molar excess of the diisocyanate so as to prepare the isocyanate-terminated polyurethane. If desired, the initial reaction between the polymeric diol and the arylene diisocyanate may be carried out by using a molar excess of the diol so as to prepare a hydroxyl-terminated polyurethane. This may then be followed by a reaction with more arylene diisocyanate so as to prepare the isocyanate-terminated polymer. It is apparent that the molecular weight of the resulting polymer is determined by the molar ratio of the reactants used. In preparing this isocyanate-terminated polyurethane, substantially anhydrous conditions should be used. The reactants are agitated at a temperature between about 60° and 100° C. The time needed for completion of the reaction will depend on the temperature selected. In general, about 1 to 4 hours is sufficient at 100° C. An undesirably long time is required if the reaction temperature is lower than 60° C. Side-reactions occur when the preparation is carried out at a temperature above 100° C. The progress of the reaction can be followed by analysis for the free isocyanate content of the mixture. In general, the reaction does not require the use of a solvent; if one is employed it must contain no groups reactive with isocyanates. The conversion of the resulting isocyanate-terminated polyurethane to an amine-terminated polymer may be accomplished by a hydrolysis of the isocyanate end groups with a compound such as hydrochloric acid. Thus the isocyanate-terminated polyurethane may be dissolved in a water-miscible solvent such as tetrahydrofuran and then treated by agitation with a large molar excess of hydrochloric acid. The mixture may then be neutralized by means of a compound such as potassium carbonate with the liberation of free amino groups.

The polymeric diols which are useful in the preparation of the polyurethane diamines of the present invention should have molecular weights of from about 720 to about 5730 and may be any one of a variety of diols. Thus a polyalkyleneether glycol, a polyalkylene-aryleneether glycol, and a hydroxyl-terminated aliphatic hydrocarbon polymer may be used. It is to be understood that mixtures of these diols may be used.

The polyalkyleneether glycols may be represented by the formula $HO(RO)_nH$ where R is an alkylene radical containing up to 10 carbon atoms and n is an integer. Some examples of these glycols are polyethleneether glycol, polypropyleneether glycol, polyhexyleneether glycol, polytrimethyleneether glycol, polytetramethyleneether glycol, polypentamethyleneether glycol, polydecamethyleneether glycol, poly-1,2-dimethyl ethyleneether glycol, and the copolymer of tetrahydrofuran and 1-allyloxy-2,3-epoxypropane. The alkylene groups need not all be the same. These polyalkyleneether glycols are made by the polymerization of cyclic ethers such as alkylene oxides or dioxolane or by the condensation of the glycols. The preferred polyalkyleneether glycol is poltetramethyleneether glycol (also known as poly-n-butyleneether glycol) which is prepared by the acid-catalyzed polymerization of tetrahydrofuran.

Another class of glycols are the polyalkylenearyleneether glycols. These glycols are similar to the polyalkyleneether glycols except that some arylene radicals are present. The phenylene, naphthylene and anthracene radicals may be used with or without substituents such as alkyl or alkylene groups, and, in general, there should be at least one polyalkyleneether radical having a molecular weight of about 500 for each arylene radical which is present.

The polyaliphatic hydrocarbon diols may be prepared by polymerizing appropriate polymerizable ethylenically unsaturated monomers, at least 50% of which are conjugated dienes. A convenient source of free radicals for making the above polyaliphatic hydrocarbon diols by polymerization are the aliphatic azo dicarboxylates in which the carbons attached to the azo group are tertiary, having the general formula

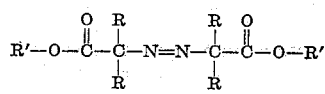

When heated, these compounds yield nitrogen and free radicals corresponding to the groups originally attached to the azo group. The free radicals generated attack the polymerizable monomer present and initiate its polymerization. The desired polymer molecular weight may be obtained by a proper choice of the molar ratio of monomer to azo compound, the higher ratios giving the longer chains. When the dicarboxylate-terminated polymer is reacted with lithium aluminum hydride, the carboxyl groups are converted to hydroxyl groups and the ethylenic unsaturation in the chain and side chain is not affected. The polyaliphatic hydrocarbon diols which are saturated in their aliphatic portion are prepared by catalytic reduction of the corresponding unsaturated polyaliphatic hydrocarbons over Raney nickel.

Any of a wide variety of arylene diisocyanates may be employed in the reaction. Representative compounds include toluene-2,4-diisocyanate, m-phenylenediisocyanate, 4,4'-biphenylenediisocyanate, chlorobenzene-2,4-diisocyanate, 1,5-naphthylenediisocyanate. Compounds such as toluene-2,4-diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, may be used.

As mentioned above, after the isocyanate-terminated polyurethane is prepared, the terminal isocyanate groups may then be converted to amino groups by means of an acid hydrolysis. The isocyanate-terminated polyurethane is dissolved in a water-miscible organic solvent and the solution obtained is poured into about an equal volume of 5–7 N sulfuric or hydrochloric acid. This mixture is agitated vigorously for about 16 hours at room temperature. A water-soluble inorganic base is then added to neutralize the acid present and to salt out the polymer and the organic solvent. The organic layer is separated and concentrated under vacuum.

The organic solvent used should be miscible with water to facilitate the hydrolysis. The use of water-immiscible solvents in the hydrolysis will make the rate of hydrolysis diffusion-controlled and opportunity will be given for chain extension to occur. The solvent should be unreactive with isocyanates (i.e., contain no active hydrogen atoms as determined by the Zerewitinoff procedure); it should not react with arylene amines or sulfuric or hydrochloric acid under the conditions of the hydrolysis. Furthermore, it should be volatile enough to permit ready removal under vacuum at the conclusion of the reaction. Dioxane, acetone, and tetrahydrofuran are representative solvents; tetrahydrofuran is preferred.

The mineral acid used should be about 5–7 N. Stronger solutions tend to hydrolyze the urethane polymer linkages with consequent decrease in molecular weight. Weaker solutions lead to incomplete hydrolysis of the terminal-isocyanate groups. The acid must be strong enough to tie up the newly liberated amine groups as salts; otherwise the residual isocyanate groups will add to these amine groups and bring about undesired chain extension. Hydrochloric and sulfuric acid are preferred.

The reaction is best carried out at room temperature. Below room temperature the hydrolysis proceeds too slowly; while above room temperature undesired side reactions begin to occur.

The reaction mixture is neutralized by an inorganic base which serves to salt the organic phase from the water phase. Potassium carbonate is preferred because it is very soluble in water and very insoluble in the polymer product. Sodium hydroxide and potassium hydroxide may be used to neutralize the acid but they should not be employed as salting out agents because their polymer solubility is sufficient to entail an additional purification step.

Another method available for the preparation of the polyurethane diamines from the present invention is by initially preparing a nitro-terminated polyurethane and then reducing the nitro terminal groups to amino groups. In this method, a polymeric diol is first reacted with a molar excess of a nitro-substituted monoisocyanate. Any of the polymeric diols described above for use with an organic diisocyanate may be utilized for reaction with a nitro-substituted monoisocyanate. Any of a wide variety of nitro-substituted monoisocyanates may be used in this reaction, including 4-nitro-o-tolylisocyanate
5-nitro-o-tolylisocyanate
6-nitro-o-tolylisocyanate
5-nitro-m-tolylisocyanate
6-nitro-m-tolylisocyanate
2-nitro-p-tolylisocyanate
2-nitro-p-phenetylisocyanate
5-nitro-2-isocyanatodiphenyl
4'-nitro-2-isocyanatodiphenyl
2'-nitro-3-isocyanatodiphenyl
3'-nitro-3-isocyanatodiphenyl
3'-nitro-4-isocyanatodiphenyl
4'-nitro-4-isocyanatodiphenyl
4'-nitro-2-isocyanatodiphenyl ether
5-nitro-2-isocyanatodiphenyl ether
5-nitro-2-isocyanatodiphenylmethane
4'-nitro-4-isocyanato-3,3'-dimethyldiphenyl
2-methoxy-5-nitrophenylisocyanate
2-methoxy-4-nitrophenylisocyanate
2-methoxy-3-nitrophenylisocyanate
3-methoxy-5-nitrophenylisocyanate
3-methoxy-4-nitrophenylisocyanate
4-methoxy-3-nitrophenylisocyanate
4,5-dimethyl-6-nitro-o-tolylisocyanate
4-ethyl-6-nitro-o-tolylisocyanate
4-nitro-5-ethyl-o-tolylisocyanate
4-nitro-2-methyl-1-naphthylisocyanate
3-nitro-1-naphthylisocyanate
4-nitro-1-naphthylisocyanate
5-nitro-1-naphthyliscyanate
8-nitro-1-naphthylisocyanate
4-nitro-2-naphthylisocyanate
6-nitro-2-naphthylisocyanate
7-nitro-2-naphthylisocyanate
2-ethoxy-5-nitrophenylisocyanate
2-ethoxy-4-nitrophenylisocyanate
2-ethoxy-3-nitrophenylisocyanate
3-ethoxy-5-nitrophenylisocyanate
3-nitrophenylisocyanate
4-nitrophenylisocyanate 2-nitro-p-tolylisocyanate is preferred. These isocyanates are prepared by phosgenation of the corresponding amines and decomposition of the carbamyl chlorides.

The nitro-terminated polyurethane may be converted to the polyurethane diamines of the present invention by reduction of the terminal nitro groups to amino groups. This reduction is carried out advantageously by catalytic hydrogenation at a temperature between about 70° and 100° C. and at a pressure between about 200 and 1000 lbs./sq. in. in the presence of about 2 to 10% Raney nickel by weight of nitro compound. The mass obtained is added to an inert solvent such as tetrahydrofuran and the catalyst is subsequently removed by filtration. The product is finally isolated by concentrating the filtrate under vacuum. The time required for converting all the nitro groups present will depend on the temperature, the hydrogen pressure, the degree of agitation, the amount and activity of the catalyst. In general about 3 to 5 hours at 70° C. is suitable when the Raney nickel concentration is about 3 to 5% by weight of the nitro compound and the hydrogen pressure is 200 lbs./sq. in. An inert solvent such as tetrahydrofuran may be used, if desired.

Another method available is the reaction of a bischloroformate of a polymeric diol with a molar excess of a primary arylene diamine. Any of the polymeric diols discussed above may be used to react with phosgene to form the bischloroformate. This may be accomplished by adding a bischloroformate solution to a diamine solution at room temperature over a period of about 1 to 2 hours. It is to be understood that a somewhat shorter time may be used if external cooling is provided to keep the temperature of the reaction mass from rising above 50° C. After the reactants have been mixed it is generally sufficient to stir them at room temperature for about 16 hours to complete the polymerization. Less time will be required when the reaction is carried out at a temperature above room temperature.

Both the arylene diamine and the bischloroformate may be dissolved in mixtures of solvents. It is to be understood that these solvents must be miscible in each other and that they must be able to keep the arylene diamine, the bischloroformate, and the polyurethane diamine in solution during the reaction. The concentrations employed are critical only to the extent that everything except the acid acceptor must be in solution. Convenience of agitation, however, may dictate a practical concentration limit below that imposed by solubility considerations alone. In general, concentrations ranging from about 10 to 20% by weight of solvent are suitable. Representative organic solvents include benzene, xylene, toluene, tetrahydrofuran and o-dichlorobenzene.

The acid acceptor which is used in the polymerization process of the present invention ties up the hydrogen chloride which is formed by the reaction of the bischloroformate with the diamine. This acceptor must be a group IA or IIA metal oxide, hydroxide, or carbonate which is insoluble in the organic solvent used. Representative compounds include calcium hydroxide (which is preferred), magnesium oxide, strontium oxide, sodium hydroxide, potassium hydroxide calcium hydroxide, barium hydroxide, and sodium carbonate. There must be enough acid acceptor present to neutralize all the hydrogen chloride liberated during the reaction. It is recommended that the ratio of the number of equivalents of base provided to the number of equivalents of acid liberated be at least 2.

Representative arylene diamines include m-phenylenediamine, toluene-2,4-diamine, 4,4'-diaminodiphenylmethane, 4,4'-diamino-3,3'-dichlorodiphenylmethane, 4,4'-diamino - 3,3' - diethoxydiphenylmethane, p-phenylenediamine, toluene-2,6-diamine, 4-methoxy-m-phenylenediamine, 2-methoxy-m-phenylenediamine, 4-chloro-m-phenylenediamine, 2-chloro-m-phenylenediamine, 4-bromo-m-phenylenediamine, 4-ethoxy-m-phenylenediamine, 2-ethoxy-m-phenylenediamine, 4-phenoxy - m - phenylenediamine, 2,4'-diaminodiphenylether, 4,4'-diaminodiphenylether, cumene-2,4-diamine, cumene-2,6-diamine, 5,6-dimethyl-m-phenylenediamine, 2,3-dimethyl-p-phenylenediamine, 2,4-dimethyl-m-phenylenediamine, 4,6-dimethyl-m-phenylenediamine, 3,6-dimethyl-p-phenylenediamine, 1,4-anthracenediamine, 9,10-anthracenediamine, 2,2'-diaminodibenzyl, 4,4'-diaminodibenzyl, 3,4'-diaminodibenzyl, 4,4'-diamino-3,3'-dimethyltriphenylmethane, 4,4'-diamino - 2,2' - dimethyldiphenyl, 4,4' - diamino - 2,6 - dimethyldiphenyl, 2,4'-diaminodiphenyl, benzidine, 2,6-diaminobenzfuran, 2,5-fluorenediamine, 2,4-stilbenediamine, o-dianisidine, p-dianisidine, 1,4-naphthalenediamine, 1,8-napththalenediamine, 2,6-naphthalenediamine.

The methods for the preparation of these polyurethane diamines will be more particularly described in the accompanying examples. It is apparent that the acid hydrolysis of an isocyanate-terminated polyurethane or the reduction of a nitro-terminated polyurethane or the bischloroformate-diamine method provides a convenient means for obtaining a polyurethane diamine of desired molecular weight since the reactions involving diols and isocyanates or bischloroformates and diamines in organic solvents are easily controlled.

The diamines of this invention are useful as intermediates for polyurethane elastomers and wire-coating compositions and as curing agents for epoxy resins. When employed as curing agents for epoxy resins, these polyurethane diamines impart improved flexibility and better impact strength to the resin.

The following examples will better illustrate the nature of the present invention; however, the invention is not intended to be limited to these examples. Parts are by weight unless otherwise indicated.

EXAMPLE 1

A. *Preparation of an isocyanate-terminated polytetramethyleneether polyurethane*

3120 parts of freshly dried polytetramethyleneether glycol of molecular weight 1040 is agitated in a dry reactor with 348.4 parts of toluene-2,4-diisocyanate for 3 hours at 100° C. The hydroxyl-terminated polytetramethyleneether polyurethane obtained is subsequently agitated for 2.5 hours at 80° C. with 348.4 parts of toluene-2,6-diisocyanate to prepare an isocyanate-terminated polytetramethyleneether polyurethane.

B. *Preparation of an amine-terminated polytetramethyleneether polyurethane*

400 parts of the isocyanate-terminated polytetramethyleneether polyurethane prepared above is dissolved in 444 parts of tetrahydrofuran. The solution obtained is poured into 1098 parts of 6 N hydrochloric acid. The resulting mixture is stirred vigorously for 16 hours at room temperature and subsequently treated with potassium carbonate which neutralizes the acid present and salts out the organic material. The organic layer which separates is heated under vacuum at 50° to 60° C. to remove the tetrahydrofuran and traces of water. The amine-terminated polyurethane thereby obtained is a dark, viscous liquid.

EXAMPLE 2

A. *Preparation of an isocyanate-terminated polytetramethyleneether polyurethane*

3120 parts of freshly dried polytetramethyleneether glycol of molecular weight 1040 is agitated in a dry reactor with 348.4 parts of toluene-2,4-diisocyanate for 3 hours at 100° C. The hydroxyl-terminated polytetramethyleneether polyurethane obtained is subsequently agitated for 2.5 hours at 80° C. with 348.4 parts of toluene-2,4-diisocyanate to prepare an isocyanate-terminated polytetramethyleneether polyurethane.

B. *Preparation of an amine-terminated polytetramethyleneether polyurethane*

400 parts of the isocyanate-terminated polytetramethyleneether polyurethane prepared above is dissolved in 444 parts of tetrahydrofuran. The solution obtained is poured into 1098 parts of 6 N hydrochloric acid. The resulting mixture is stirred vigorously for 16 hours at room temperature and subsequently treated with potassium carbonate which neutralizes the acid present and salts out the organic material. The organic layer which separates is heated under vacuum at 50° to 60° C. to remove the tetrahydrofuran and traces of water. The amine-terminated polyurethane thereby obtained is a dark, viscous liquid.

EXAMPLE 3

A. *Preparation of a nitro-terminated polytetramethyleneether polyurethane*

3120 parts of freshly dried polytetramethyleneether glycol of molecular weight 1040 is agitated in a dry reactor with 348.4 parts of toluene-2,4-diisocyanate for 3 hours at 100° C. The hydroxyl-terminated polytetramethyleneether polyurethane obtained is subsequently agitated for 2.5 hours at 80° C. with 356.4 parts of 2-nitro-p-tolylisocyanate to prepare a nitro-terminated polytetramethyleneether polyurethane.

B. *Preparation of an amine-terminated polytetramethyleneether polyurethane*

A mixture of 541.2 parts of the nitro-terminated polytetramethyleneether polyurethane prepared above and about 15 parts of Raney nickel is stirred at 70° C. for 3 hours under 200 lbs./sq. in. of hydrogen pressure in an autoclave. When the pressure is then released, frothing occurs due to desorption of hydrogen from the catalyst. The contents of the autoclave are added to tetrahydrofuran and the insoluble catalyst is subsequently removed by filtration. The filtrate is concentrated under vacuum at 100° C. to yield the amine-terminated polytetramethyleneether polyurethane. Analysis of the viscous oil for basic nitrogen gives a value of 0.75% which corresponds to a molecular weight of 3890.

C. *Use as a wire coating*

13 parts of di(3-isocyanato-4-methylphenyl) urea and 100 parts of the polymeric diamine (prepared above in B) are dispersed together on an ink mill. Copper wire (16 gauge) is uniformly coated by passing it through this dispersion and subsequently extruding it through a die. The coated wire is passed through a zone maintained at 150° C. in which it becomes rapidly tack-free. It is then wound on spools and cured at 150° C. for 1 hour. The coating is tough and flexible.

*Preparation of the bischloroformates*

The bischloroformates of the polymeric diols used in the examples below are prepared by phosgenation. The following procedure illustrates the method. 250 parts of polytetramethyleneether glycol, having a molecular weight of 1070, is added slowly over an hour period to 100 parts of liquid phosgene at 0° to 10° C. while stirring is maintained. Vaporized phosgene is returned to the reaction by a reflux condenser. The mixture is stirred an additional hour after the addition is complete. The mass is then allowed to warm up to 25° to 30° C. and the phosgene is permitted to boil off. Finally, nitrogen is blown through the mass until the exit gas shows an absence of phosgene.

EXAMPLE 4

88.8 parts of finely-divided calcium hydroxide is suspended in a solution composed of 80.1 parts of 4,4'-diamino-3,3'-dichlorodiphenylmethane in 1735 parts of anhydrous benzene. A solution of 213 parts of polytetramethylene-bischloroformate of molecular weight 1070 in 812 parts of anhydrous benzene is added dropwise over a 4.5-hour period to the above suspension. The resulting mixture is stirred for 16 hours at room temperature. The inorganic matter is removed by filtration and the filtrate is concentrated under vacuum. The viscous, brown resin obtained analyzes for 0.40 meq./g. amino nitrogen, which corresponds to a molecular weight of 5000.

EXAMPLE 5

74.1 parts of calcium hydroxide is suspended in a solution composed of 18.3 parts of 2,4-diaminotoluene in 655 parts of anhydrous benzene. A solution of 111 parts of polytetramethyleneether - bischloroformate of molecular weight 1110 in 480 parts of anhydrous benzene is added dropwise with stirring to the above suspension over a 2 to 3 minute period. The mixture is subsequently agitated at room temperature for 2 hours, filtered through diatomaceous earth, and the filtrate is concentrated at reduced pressure. The oil obtained analyzes for 0.841 meq. amine end groups per g. polymer, which corresponds to a molecular weight of 2378.

EXAMPLE 6

A. *Preparation of the polymeric diamine*

175 parts of finely-divided calcium hydroxide is suspended in a solution composed of 32.6 parts of m-phenylenediamine in 1200 parts of anhydrous benzene. A solution of 171.4 parts of polytetramethyleneether-bischloroformate of molecular weight 1135 in 500 parts of benzene is added dropwise with stirring over a 1½ hour period to the above suspension. The resulting mixture is agitated for 16 hours at room temperature, filtered through diatomaceous earth, and concentrated at reduced pressure. A viscous oil is obtained. The molecular weight of the polyurethane diamine is 1278.

B. *Curing of epoxy resin with polyurethane diamine*

The epoxy resin used in this example is a reaction product of epichlorohydrin and 2,2'-bis(4-hydroxyphenyl)-propane analyzing for about 5 meq. epoxide per g. resin (which indicates a number-average molecular weight of about 400). This product is commercially available from the Shell Chemical Company as "Epon" 828.

(1) A mixture of 12.4 parts of the polyurethane diamine prepared in A above and 7.6 parts of the epoxy resin is heated while being stirred to about 95° C. The de-aerated mixture is poured into a mold preheated to about 110° C. The mold is then placed in an oven at 100° C. for 24 hours. The slab of cured epoxy resin obtained has a tensile strength at break of 2200 p.s.i. and an extension at break of 210%.

(2) The mixture of Example 6–B(1) is poured into molds which are then kept in an oven at 130° C. for 2, 4 and 6 hours. The slabs of cured epoxy resin obtained have the properties given in the following Table I:

TABLE I.—THE EFFECT OF CURETIME ON TENSILE STRENGTH

| Hours at 130° C. | Tensile Strength at Break (p.s.i.) | Extension at Break (Percent) |
| --- | --- | --- |
| 2 | 2,400 | 210 |
| 4 | 2,900 | 165 |
| 6 | 3,000 | 160 |

(3) The mixture of Example 6–B(1) is placed in an oven at 170° C. for 2 hours. The slab of cured epoxy resin obtained has a tensile strength at break of 2750 p.s.i. and an extension at break of 120%.

(4) A mixture of 6.4 parts of the polyurethane diamine prepared in A above, 0.33 part of cumene-2,4-diamine, 0.33 part of m-phenylenediamine, and 8 parts of the epoxy resin is heated while being stirred to about 95° C. The de-aerated mixture is poured into a mold preheated to about 110° C. The mold is then placed in an oven at 170° C. for 2 hours. The slab of cured epoxy resin obtained has a tensile strength at break of 5000 p.s.i. and an extension at break of less than 10%.

(5) A mixture of 9.6 parts of the polyurethane diamine prepared in A above, 0.16 part of cumene-2,4-diamine, 0.16 part of m-phenylenediamine, and 8 parts of the epoxy resin is de-aerated as described in section 6–B(1) and cured in a mold at 170° C. for 2 hours. The slab of cured epoxy resin obtained has a tensile strength at break of 3700 p.s.i. and an extension at break of 40%.

EXAMPLE 7

A. *Preparation of the polymeric diamine*

260 parts of finely-divided calcium hydroxide is suspended in a solution composed of 105.5 parts of 4,4'-diaminodiphenylmethane in 1748 parts of anhydrous benzene. A solution of 236 parts of polytetramethyleneether-bischloroformate of molecular weight 1008 in 1748 parts of anhydrous benzene is added dropwise with stirring over a 3-hour period. The mixture is stirred for 16 hours at room temperature and filtered through diatomaceous earth. The filtrate is concentrated by gradually raising the temperature to 110° C. and reducing the pressure to 1 mm. Hg. The product is 309 parts of a viscous oil analyzing for 2.0 meq. of end-amine groups per g. of polymer, which corresponds to a molecular weight of 1000.

*B. Curing of an epoxy resin with the polyurethane diamine*

The epoxy resin used in this example is the same as that given above in Example 6–B.

(1) 100 parts of the epoxy resin is stirred at room temperature with 196 parts of the polyurethane diamine prepared in A above. The resulting mixture is heated to about 95° C. while being agitated. The de-aerated mass is poured into a mold preheated to about 110° C. The mold is then placed in an oven at 125° C. for 2 hours. The cured epoxy resin is a tough, flexible, clear slab whose properties are given below in Table II.

(2) 100 parts of the epoxy resin is stirred at room temperature with 120.6 parts of the polyurethane diamine of A above. The resulting mixture is heated and cast as described above. The cured epoxy resin is a clear, tough, flexible slab whose properties are given in Tables II and IV.

(3) 100 parts of the epoxy resin is stirred at room temperature with 147.5 parts of the polyurethane diamine of A above, 2.06 parts of cumene-2,4-diamine and 2.06 parts of m-phenylenediamine. The resulting mixture is heated and cast as described above. The cured epoxy resin is a clear, tough, flexible slab whose stress-strain properties are given in Tables II and III.

The electrical properties of a sheet cast from the mixture and cured were tested at room temperature and 1000 c.p.s.

Insulation resistance _____ $1.94 \times 10^{14}$ ohm-cm.
Specific inductance capacity _____ 5.21
Power factor _____ 3.01%

(4) 100 parts of the epoxy resin is stirred at room temperature with 97.5 parts of the polyurethane diamine of A above, 4.19 parts of cumene-2,4-diamine and 4.19 parts of m-phenylenediamine. The resulting mixture is heated and cast as described above. The cured epoxy resin is a clear, tough, flexible slab whose properties are given in Table II.

TABLE II.—EFFECT OF COMPOSITIONS CHANGES ON STRESS-STRAIN PROPERTIES

| Composition | Tensile Strength at Break | | | Extension at Break (room temp.) percent |
|---|---|---|---|---|
| | (room temp.) p.s.i. | (65° C.) p.s.i. | (95° C.) p.s.i. | |
| 1 | 3,300 | 300 | 150 | 170 |
| 2 | 3,600 | (Not measured) | (Not measured) | 115 |
| 3 | 4,300 | 750 | 225 | 130 |
| 4 | 4,700 | 1,210 | 500 | <10 |

After 1 week aging at 170° C. the tensile strength at break (at room temperature) is 1000 p.s.i. and the extension at break (at room temperature) is approximately 0%.

TABLE III.—EFFECT OF HEAT AGING TEMPERATURE ON RESIN STRESS-STRAIN PROPERTIES

| Aging Temperature | Tensile Strength at Break (Room Temperature), p.s.i. | Extension at Break (Room Temp.) Percent |
|---|---|---|
| Room Temp | 3,300 | 110 |
| 100° C | 4,500 | 105 |
| 145° C | 3,600 | 50 |
| 170° C | 3,200 | <10 |

TABLE IV.—THE EFFECT OF TEMPERATURE ON THE ELECTRICAL PROPERTIES OF EPOXY RESIN

| Property | Room | 70° C. | 100° C. | 120° C. |
|---|---|---|---|---|
| D.C. Resistivity (ohm-cm) | $1.44 \times 10^{14}$ | $7.34 \times 10^{12}$ | $6.27 \times 10^{11}$ | $1.68 \times 10^{11}$ |
| Specific Inductance Capacity | 5.78 | 6.73 | 7.18 | 6.97 |
| Power Factor, Percent | 2.77 | 3.42 | 2.42 | 0.737 |

As many widely different embodiments of this invention may be made without departing from the spirit and scope thereof, it is to be understood that this invention is not limited to the specific embodiments thereof except as defined in the appended claims.

What is claimed is:

1. A polyurethane diamine of the formula

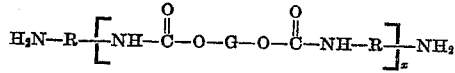

wherein O—G—O is a bivalent radical obtained by removing the terminal hydrogen atoms from a polymeric diol having a molecular weight of from about 720 to 5730 and being selected from the group consisting of polyalkyleneether glycols, polyalkylene-aryleneether glycols, and hydroxyl-terminated aliphatic hydrocarbon polymers; R is a bivalent arylene radical which is inert to isocyanate groups; and $x$ is an integer so that the diamine have a molecular weight of from about 990 to 6000.

2. A diamine according to claim 1 wherein the bivalent radical O—G—O is obtained by removing the terminal hydrogen atoms from a polyalkyleneether glycol.

3. A diamine according to claim 2 wherein the polyalkyleneether glycol is a polytetramethyleneether glycol.

4. A diamine according to claim 3 wherein R is a phenylene radical.

5. A diamine according to claim 3 wherein R is a 2,4-tolylene radical.

6. A diamine according to claim 3 wherein R is a bivalent radical having the formula

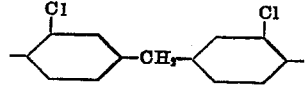

References Cited in the file of this patent

UNITED STATES PATENTS

| | | |
|---|---|---|
| 2,660,574 | Jones et al. | Nov. 24, 1953 |
| 2,757,191 | Stilmar | July 31, 1956 |
| 2,835,654 | Carter et al. | May 20, 1958 |
| 2,843,569 | Benning et al. | July 15, 1958 |

OTHER REFERENCES

Heiss et al.: "Industrial and Engineering Chemistry," vol. 46, No. 7, pages 1498–1503. (Copy in Sci. Libr.)